United States Patent
Schöder

(10) Patent No.: US 6,260,354 B1
(45) Date of Patent: Jul. 17, 2001

(54) HYDRODYNAMIC TORQUE CONVERTER HAVING A TURBINE SHELL WITH STIFFENERS

(75) Inventor: Bernd Schöder, Münnerstadt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/371,110

(22) Filed: Aug. 10, 1999

(30) Foreign Application Priority Data

Aug. 11, 1998 (DE) ............................................... 198 36 258

(51) Int. Cl.[7] ................................................... F16H 45/02

(52) U.S. Cl. ............................................................ 60/330

(58) Field of Search ............................. 60/330, 364, 366; 192/3.29

(56) References Cited

U.S. PATENT DOCUMENTS

| | | | |
|---|---|---|---|
| 4,353,444 | * 10/1982 | Bionaz | 192/3.29 |
| 5,203,835 | * 4/1993 | Kohno et al. | 192/3.29 |
| 5,575,364 | * 11/1996 | Friedmann et al. | 192/3.29 |
| 5,762,172 | * 6/1998 | Tsukamoto et al. | 192/3.29 |

FOREIGN PATENT DOCUMENTS 44 23 640  6/1995  (DE) .

* cited by examiner

Primary Examiner—John E. Ryznic
(74) Attorney, Agent, or Firm—Cohen, Pontani, Lieberman & Pavane

(57) ABSTRACT

A hydrodynamic torque converter a hydrodynamic circuit has at least a pump impeller and a turbine wheel. The turbine wheel has a turbine shell with a blading and a turbine hub which is in rotary connection with an output shaft. The turbine shell extends radially inward between an extension region of axial abutments and is provided with stiffeners.

8 Claims, 2 Drawing Sheets

HYDRODYNAMIC TORQUE CONVERTER HAVING A TURBINE SHELL WITH STIFFENERS

BACKGROUND OF THE INVENTION

1. Field of the Invention

The invention relates to a hydrodynamic torque converter having a hydrodynamic circuit including a pump wheel and a turbine wheel, wherein a turbine shell of the turbine wheel extends between two axial abutments for axially positioning the turbine wheel.

2. Description of the Related Art

A prior art hydrodynamic torque converter having a hydrodynamic circuit is disclosed in DE 44 23 640 A1 (see FIG. 1) which has a pump impeller, a turbine wheel and a stator. The turbine wheel has a turbine shell, which is formed with blading. A radially inner region of the turbine shell is connected in a rotationally locked manner to a radial flange of a turbine hub via riveting. The radial flange of the turbine hub interacts with axial abutments, which are provided on both sides and position the turbine wheel axially between a housing hub of the converter housing and the stator. Of course, this radial flange of the turbine hub must have sufficient flexural rigidity to fulfill this task.

The stator is guided via a freewheel having a supporting ring axially between it and one of the axial abutments for the turbine hub described above. The supporting ring is provided with grooving for the throughflow of converter fluid, which originates from a supply reservoir and passes via a fluidic connection to the supporting ring. The converter fluid is delivered via the grooving of the supporting ring into the converter circuit.

The above-described prior art torque converter is comparatively complicated to produce and is comparatively expensive because, on the one hand, it has a turbine hub which is complicated with regard to its shape with the radial flange and also has to be connected to the turbine shell via labor-intensive riveting and, on the other hand, the supporting ring between the freewheel and the adjacent axial abutment requires grooving for the throughflow of converter fluid. This grooving also results in a reduced contact surface of the supporting ring on the adjacent component causing an increased surface pressure on the supporting ring.

SUMMARY OF THE INVENTION

The object of the present invention is to design a hydrodynamic torque converter such that, with minimum production effort and at minimum cost, the turbine wheel is axially positioned while ensuring that the converter circuit is supplied with converter fluid.

This object is achieved according to the invention by a hydrodynamic torque converter having a hydrodynamic circuit, comprising a pump impeller wheel having an impeller shell and impeller blading connected to an impeller hub, a turbine wheel having a turbine shell and turbine blading connected to a turbine hub, an output shaft in rotary connection with said turbine hub, and axial abutments for axially positioning said turbine wheel, wherein said turbine shell comprising a wall extending radially inward between said axial abutments and wherein said turbine shell comprises stiffeners in a region of said turbine shell between said axial abutments.

The turbine shell of the present invention is formed to extend radially between the extension region of the axial abutments. No additional production effort is required compared with the designs of prior art turbine shells because the difference in production of the turbine shell between the invention and the prior art is that the die blocks for the manufacture of the turbine shells according to the invention have to be of larger radial design than for the prior art turbine shells. Because of the relatively thin wall of the turbine shell, stiffeners are provided for high axial strength, despite the comparatively small wall thickness. The radially inner end of the turbine shell according to the invention is guided between the axial abutments, thereby providing axial positioning for the complete turbine wheel. If these stiffeners are formed by axial pressed-out portions made at the wall of the turbine shell, passages may be formed either in the extension region of the respective axial pressed-out portion or circumferentially depending on the direction of the pressed out passages, in each case between two axial pressed-out portions. These passages, if they lead from the radial inner region of the axial abutments to a diameter radially outside the same and in addition are connected via a fluidic connection to a supply reservoir for converter fluid, are suitable for the throughflow of converter fluid.

In this way, the hydrodynamic circuit of the torque converter may also be supplied with converter fluid by means the region of the turbine shell that has the stiffeners. Configuration of another point for supplying of the converter circuit may therefore be dispensed with.

The radially inner end of the turbine shell has a bearing surface for mounting in position on the turbine hub. For the benefit of low surface pressure, this bearing surface, despite a small wall thickness of the turbine shell, may be designed to be relatively large if this bearing surface is created by bending the radially inner end of the turbine shell. A further advantage of such a bending is the firm connection of the turbine shell to the turbine hub via a butt weld. This may be effected with a laser welding unit and, compared with other welding processes, which require increased preparatory measures, is cost-effective and simple to produce.

A further simplification may be achieved if the turbine hub is of essentially annular design. A simple tube then suffices for the manufacture of the turbine hub.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
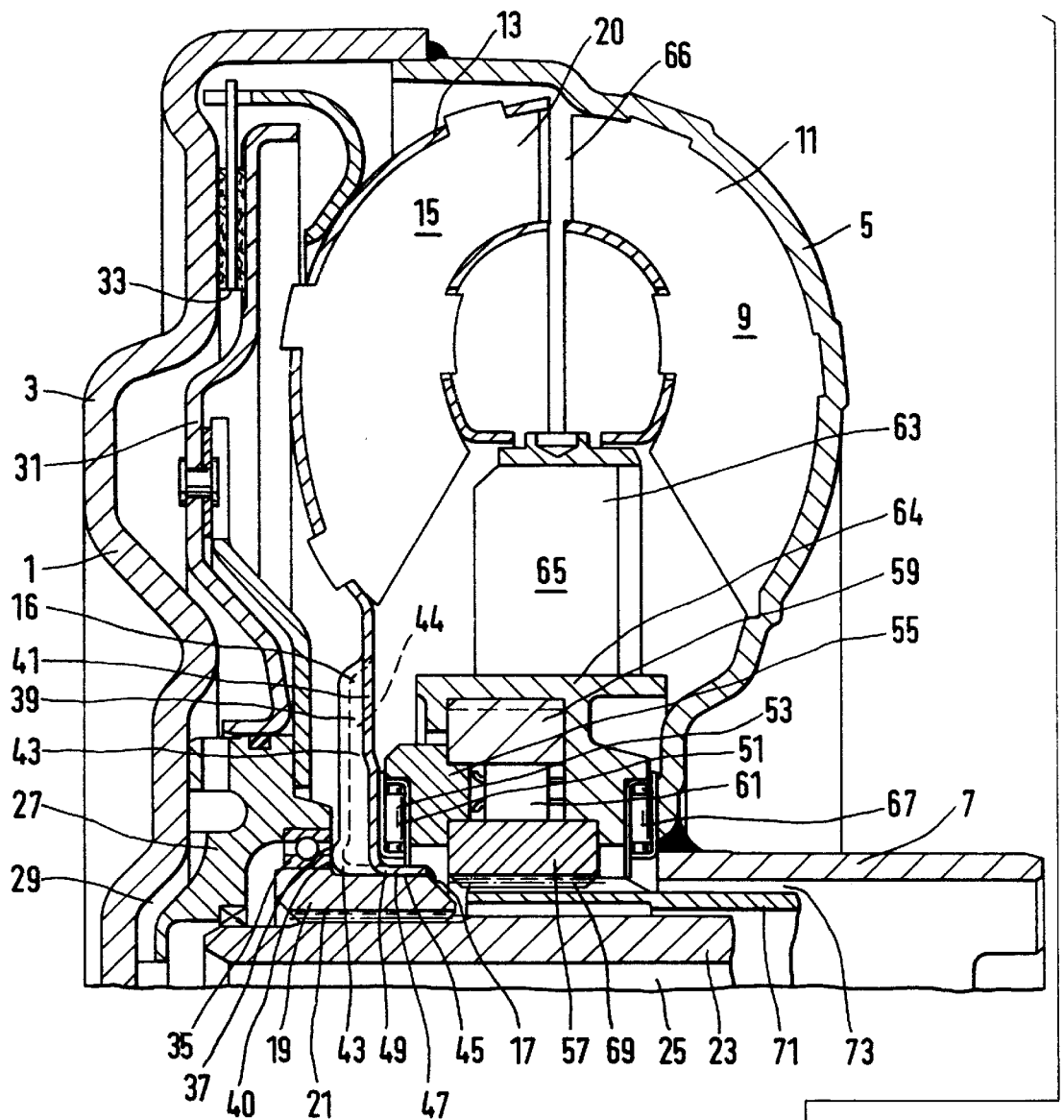
FIG. 1 is a sectional view of a radial half section of a hydrodynamic torque converter according to an embodiment of the present invention with stiffeners on a radial inner region of the turbine shell.
Figure 1:
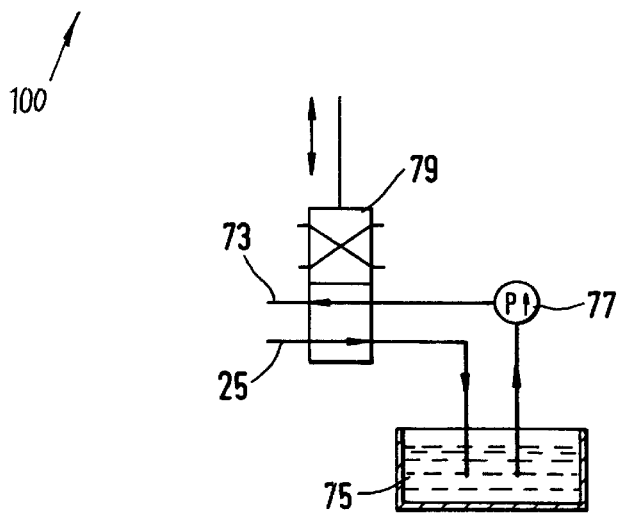

A hydrodynamic torque converter 100 with a hydrodynamic circuit 66 according to an embodiment of the present invention is shown in FIG. 1 having a converter housing 1 with a radial flange 3 on a drive side of the torque converter. Fastened to an outer circumferential region of the radial flange 3 is an impeller shell 5 which includes an impeller hub 7 on its radially inner end. The impeller shell 5 has blading 9 for forming a pump impeller 11. The pump impeller 11 interacts with a turbine wheel 20 comprising a turbine shell 13 with blading 15. A radially inner end of the turbine shell 13 includes a blade root 16, which will be described in more detail later. The blade root 16 is connected via a butt weld 17 to a turbine hub 19, which is of essentially annular design and, radially on the inside, is in rotary connection with an output shaft 23 via a tooth system 21. The output shaft 23, which may be formed, for example, by a transmission input shaft has a center bore 25 at its end facing the radial flange 3 on the drive side via which the output shaft is in fluidic connection with lines 29 of a housing hub 27 of the converter housing 1. The housing hub 27 accommodates a piston 31 of a lock-up clutch 33, which is designed and controlled in a manner known in the art, for example, from DE 44 23 640 A1 disclosed in the Background section. Accordingly, further details of this lock-up clutch 33 are not described herein.

The housing hub 27 encloses a radial bearing 35, via which the turbine hub 19 is centered relative to the converter housing 1. This radial bearing 35 also performs the function of an axial abutment 37 for the blade root 16 and thus the entire turbine wheel 20. The blade root 16 includes a multiplicity of stiffeners 39 formed at predetermined angular distances along a circumference of the turbine wheel and each come to bear via an axial projection 40 against the axial abutment 37. The stiffeners 39 comprise pressed-out portions 43 which are made by pressing a wall 41 of the turbine shell 13 toward the drive side of the torque converter 100. These axial pressed-out portions 43 create recesses relative to the rest of the side of the wall 41 which faces an axial needle bearing 51. The recesses are effective as passages 44. Furthermore, the axial needle bearing 51 is a further axial abutment 53 for the axial positioning of the turbine wheel 20.

The blade root 16 has a bend 49 at its radially inner end and thus at the radially inner end 45 of the turbine shell 13 which extends axially toward the output side of the torque converter 100. The axial course of the bend 49 forms a relatively large bearing surface 47 via which the turbine shell 13 is mounted in position on the turbine hub 19. These two components, as already mentioned, are connected by the butt weld 17, for which the axially free end of the bend 49 is preferably suitable.

The axial abutment 53 created by the axial needle bearing 51 is in axial active connection with a freewheel 61 of a stator 63 of the torque converter, via a supporting ring 55 which engages radially between an inner ring 57 and an outer ring 59 of the freewheel 61. Furthermore, the outer ring 59 is enclosed by a stator ring 64 which carries blading 65. The stator 63, the pump impeller 11 and the turbine wheel 20 form the hydrodynamic converter circuit 66 of the torque converter 100. The stator 63 is in turn supported via a radial region of its stator ring 64 on an axial needle bearing 67, which with its opposite side comes to bear on the radially inner end of the pump shell 5.

The inner ring 57 of the freewheel 61, via a tooth system 69, is in rotary connection with a supporting sleeve 71 for the freewheel 61 which has an annular fluidic connection 73 radially between itself and the impeller hub 7. The annular fluidic connection 73 opens at one end into the passages 44 of the blade root 16 and is connected at the other end to a control valve 79, which is connected via a pump 77 to a supply reservoir 75 for converter fluid. Furthermore, the center bore 25 of the output shaft 23 is connected to the control valve 79 and thus to the supply reservoir 75. In accordance with the position of this control valve 79, the lock-up clutch 33 is opened or closed.

In the position of the control valve 79 shown in FIG. 1, the pump 77 forces converter fluid into the fluidic connection 73, from which the converter fluid passes radially outward via the passages 44 into the converter circuit 66.

Figure 2:
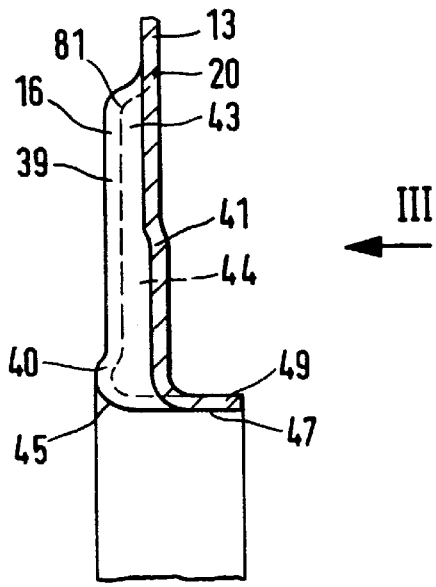
FIG. 2 is a detailed sectional view showing the radial inner end of the turbine shell of FIG. 1.
Figure 3:
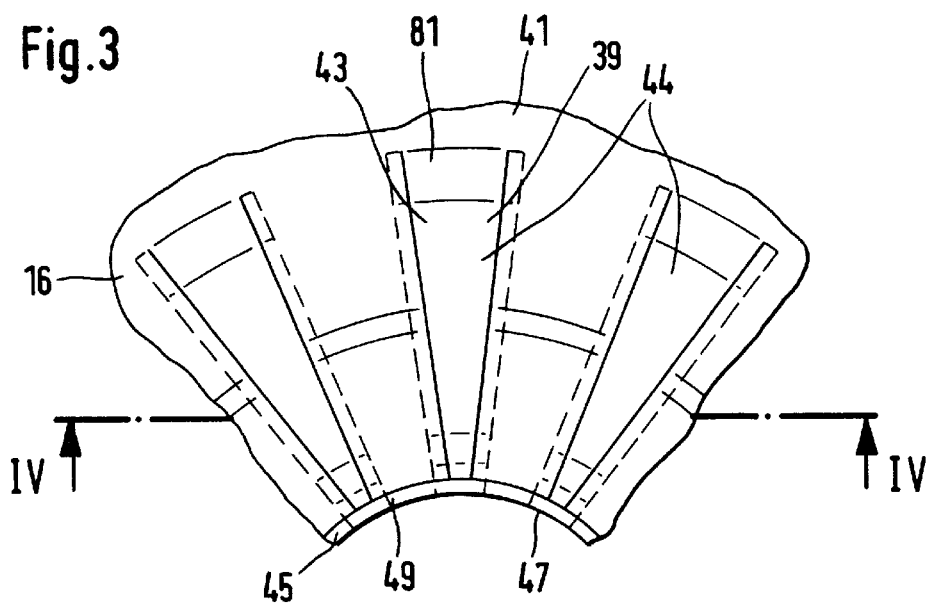
FIG. 3 shows the turbine shell of FIG. 2 in a direction shown by the arrow III shown in FIG. 2.
Figure 4:
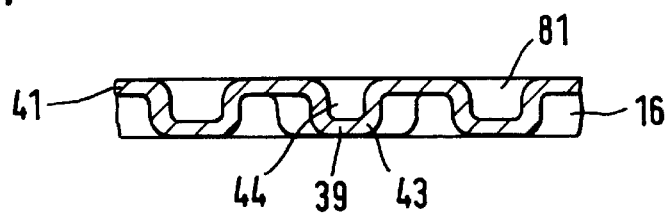
FIG. 4 is a sectional view of the turbine shell along line IV—IV in FIG. 3 with a direction of view radially from the inside of the turbine shell.

FIGS. 2 to 4 show details of the blade root 16 and in this case in particular that part of the turbine shell 13 which is essential for the invention. FIG. 2 shows a detailed view of the blade root 16, specifically showing the region of the turbine shell 13 having the stiffeners 39.

FIG. 3 shows a plan view of the course of the passages 44 created by the stiffeners 39, in which it can easily be seen that these passages 44 are each formed at equal angular distances from one another along a circumferential direction in the wall 41 of the turbine shell 13 and widen radially outward. The radially outer region of each stiffener 39 is formed with a beveled flow overspill 81, which is advantageous both from a production point of view when making the axial pressed-out portions 43 and with regard to the fluidic properties in the passages 44 on account of the smooth transition relative to the converter circuit 66.

FIG. 4 essentially shows the depth of the passages 44 and the axial dimension of the stiffeners 39 relative to the thickness of the wall 41 of the turbine shell 13.

The invention is not limited by the embodiments described above which are presented as examples only but can be modified in various ways within the scope of protection defined by the appended patent claims.

I claim:

1. A hydrodynamic torque converter having a hydrodynamic circuit, comprising:

a pump impeller wheel having an impeller shell and impeller blading connected to an impeller hub;

a turbine wheel having a turbine shell and turbine blading connected to a turbine hub;

an output shaft in rotary connection with said turbine hub; and axial abutments for axially positioning said turbine wheel, wherein said turbine shell comprises a wall extending radially inward between said axial abutments and wherein said turbine shell comprises stiffeners in a region of said turbine shell between said axial abutments.

2. The hydrodynamic torque converter of claim 1, wherein said stiffeners comprise axial pressed-out portions in said wall of said turbine shell, said axial pressed-out portions being spaced apart from one another at predetermined angular distances along a circumference of said turbine shell.

3. The hydrodynamic torque converter of claim 2, further comprising a supply reservoir containing converter fluid and at least one fluidic connection between said supply reservoir and said turbine wheel, wherein said stiffeners form passages which are connected to said at least one fluidic connection and lead into the hydrodynamic circuit.

4. The hydrodynamic torque converter of claim 3, wherein said stiffeners lead from an inner diameter of the turbine shell at a radial inner region of said axial abutments to an outer diameter radially outside said axial abutments.

5. The hydrodynamic torque converter of claim 1, wherein said turbine hub comprises an annular shape.

6. The hydrodynamic torque converter of claim 5, wherein a radial inner end of said turbine shell end comprises a bearing surface for mounting in position on said turbine hub.

7. The hydrodynamic torque converter of claim 6, wherein said bearing surface comprises a bending of said radially inner end of said turbine shell in an axial direction.

8. The hydrodynamic torque converter of claim 6, further comprising a butt weld connecting said radial inner end of said turbine shell to said turbine hub.

\* \* \* \* \*